Patented Oct. 21, 1952

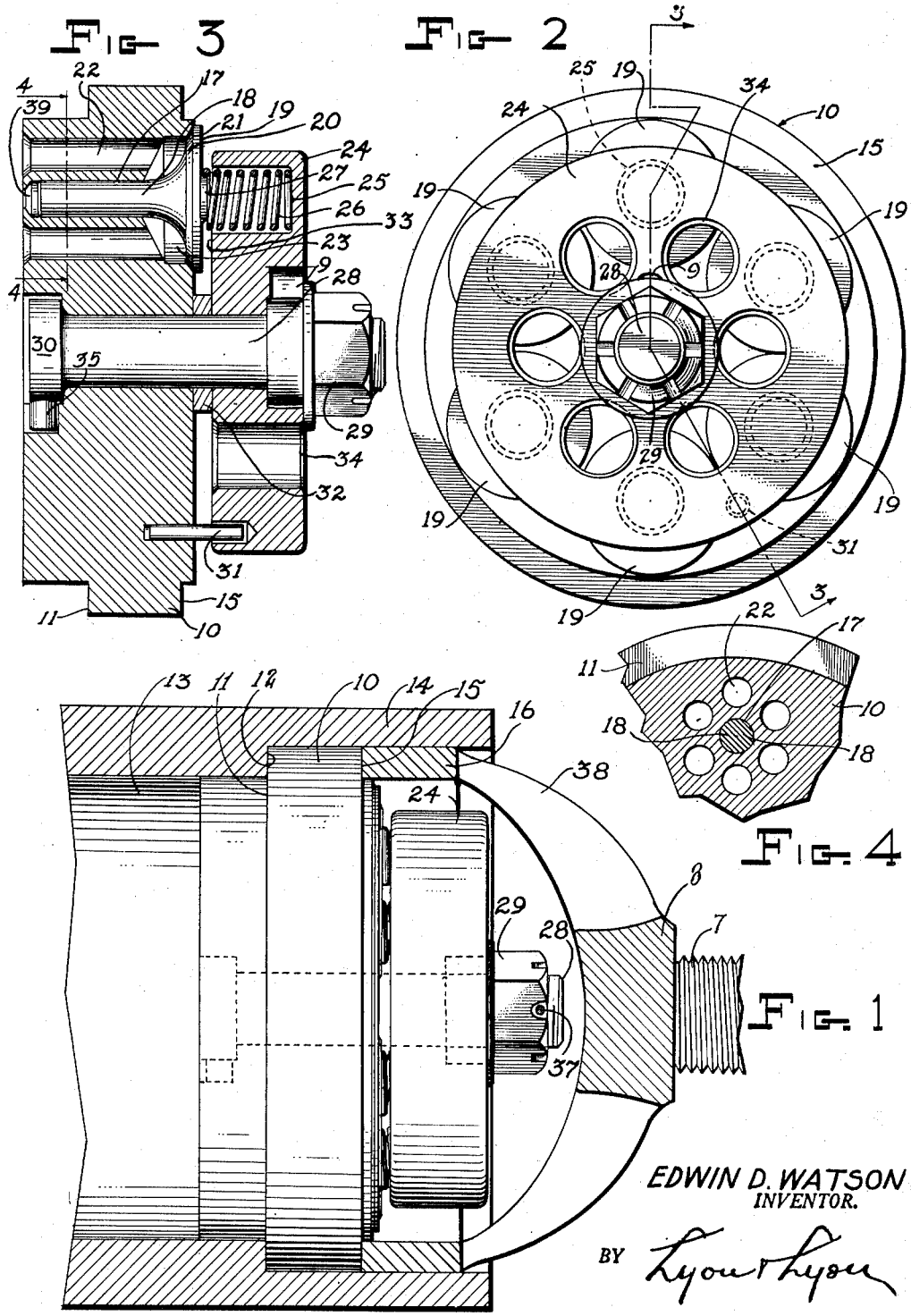

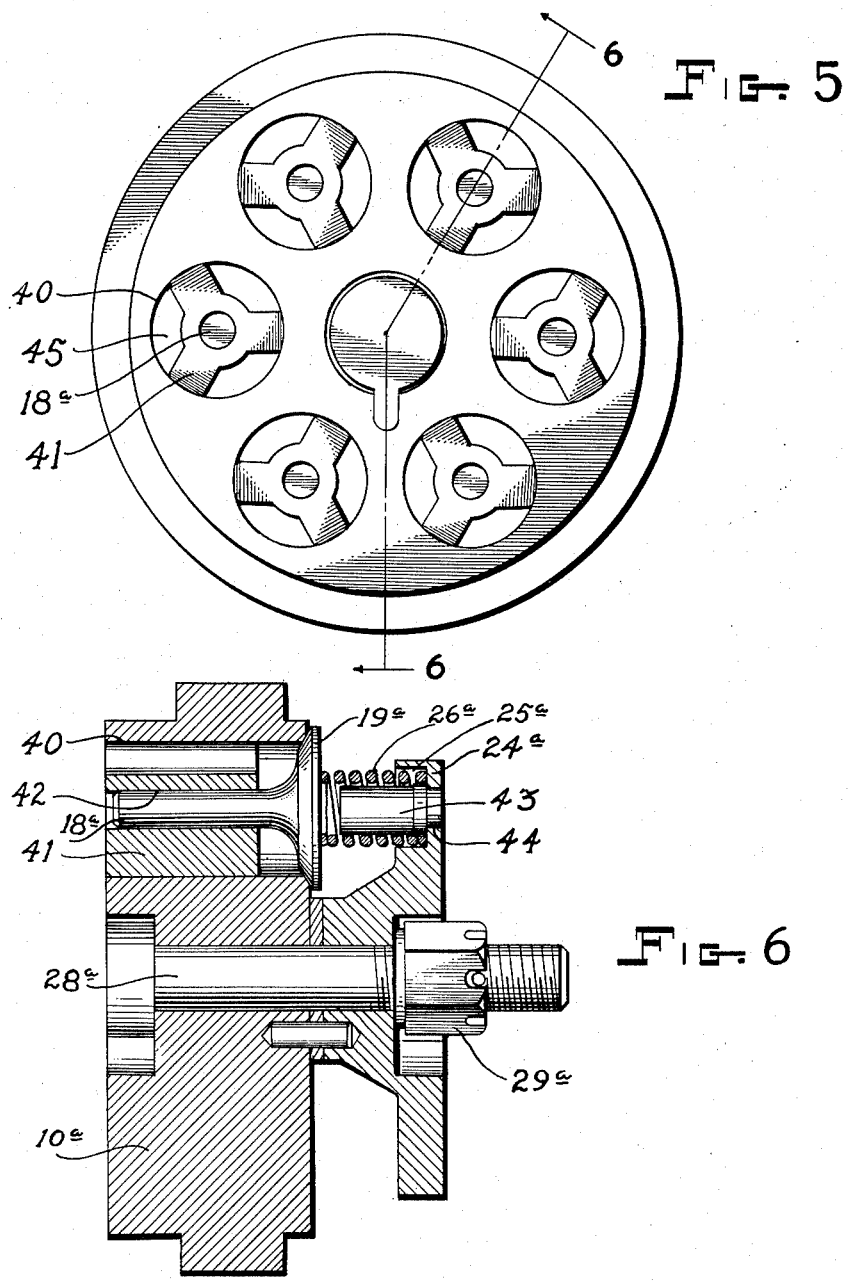

2,614,854

UNITED STATES PATENT OFFICE 2,614,854

COMPRESSOR VALVE

Edwin D. Watson, South Gate, Calif., assignor to Thompson Products, Inc., Cleveland, Ohio, a corporation of Ohio Application November 26, 1945, Serial No. 630,746

2 Claims. (Cl. 277—60)

This invention relates to valves and is particularly directed to an improved form of valve for use with a compressor. The flat ported disk-type valve commonly employed in air compressors has been found from experience to give very poor and erratic service in high pressure work. The compressors used in oil field installations, for example, often operate at pressures in excess of 1000 p. s. i. and in such cases, the compressor valves have a service life so short that the compressors are out of service for an unduly large part of the time while valve replacements are made. In a specific instance it was found that in a battery of compressors operating on gas in excess of 3000 p. s. i. that the conventional flat ported-disk valves failed after one day to thirty days' service.

It is the principal object of this invention to provide a compressor valve which will operate satisfactorily at high pressure. Another object is to provide a valve of this type in which the sealing elements employed seat positively and simultaneously over their full contact surfaces. Another object is to provide a novel form of valve assembly for a compressor, which assembly utilizies a plurality of small sealing elements traveling through a relatively short stroke, which reduces inertia effects and yet provides adequate area for passage of air or gas. Another object is to provide a valve assembly of this type which employs a novel form of retainer element for maintaining the sealing elements in operative position.

In the drawings:

Fig. 1 is a side view partly in section showing in outline a valve assembly comprising a preferred embodiment of this invention as positioned for operation in a compressor.

Fig. 2 is a top plan view of the valve assembly shown in Fig. 1.

Fig. 3 is a sectional view taken substantially on line 3—3 as shown in Fig. 2.

Fig. 4 is a fragmental sectional view taken substantially on line 4—4 as shown in Fig. 3.

Fig. 5 is a plan view showing the under side of a modified form of valve assembly embodying this invention.

Fig. 6 is a sectional view taken substantially on line 6—6 as shown in Fig. 5.

In the preferred embodiment of this invention as illustrated in Figs. 1 to 4, a body 10, which is in the form of a relatively thick disk, is provided with an annular shoulder 11 adapted to seat on a corresponding shoulder 12. The shoulder 12 is formed within a valve recess 13 provided by the housing 14, which is associated with a compressor (not shown). Axially spaced from the shoulder 11 on the body 10 is a shoulder 15 which is adapted to be engaged by an annular rim 16, which is formed integrally with a holddown bracket 8. Means including a screw 7 are provided for clamping the body 10 between the rim 16 and the shoulder 12 on the housing 14.

The body 10 is provided with a plurality of drilled holes 17 reamed to provide suitable guides for the stems 18 of a plurality of poppet valves 19. Each valve 19 is provided with a frustro-conical sealing face 20 which is adapted to seat upon a complementary seating surface 21 formed on the body 10. As shown in Fig. 4, the reamed guides 17, which receive the valve stems 18, are encircled by a plurality of drilled passageways 22. These passageways 22 extend axially through the body 10 into an enlarged recess 23 formed within the body 10 below the complementary seating surfaces 20 and 21.

Means are provided for limiting the travel of the valves 19 and for resiliently maintaining each of them against its seat on the body 10. As shown, this means includes the retainer 24, which is provided with a series of recesses 25 for the reception of helical compression springs 26. Each valve 19 has provided a base 27 on its upper face for piloting the active end of each compression spring 26. The body 10 and the retainer 24 are center bored for the reception of a bolt 28. A nut 29 threaded on the bolt 28 cooperates with the bolt head 30 to maintain the retainer 24 and body 10 at operative position. A pin 31 is provided for preventing relative rotation of the retainer 24 and body 10 about the bolt 28. A washer 32 encircling the bolt 28 is positioned between the body 10 and retainer 24.

Movement of each of the valves 19 in a direction away from its respective seat 21 is resiliently opposed by its compression spring 26 and is positively limited by the inner surface 33 on the retainer 24. In operation the poppet valves 19 are opened when the gas pressure within the chamber 23 exceeds the force exerted by the compression springs 26. The valves 19 move only a short distance until they meet the stop surface 33, but in this short travel sufficient area is obtained between the surfaces 20 and 21 to permit unrestricted passage of air or gas through the drilled passageways 22. A series of openings 34 are provided through the retainer 24 in order that air or gas passing through the valves may not be restricted by the retainer 24.

In initial assembly, the valves 19 are mounted in position on the body 10 and the compression springs 26 are placed within their recesses 25 in the retainer 24. The bolt 28 is inserted into the body 10 and the retainer 24 moved into place. The nut 29 is then threaded on to the bolt 28 to clamp the washer 32 between the retainer 24 and body 10 and thereby induce uniform initial compression within each of the springs 26. A lug 35 on the bolt-head 30 is received within a pocket 36 formed in the body 10 in order to prevent rotation of the bolt 28 when the nut 29 is turned. The usual cotter pin 37 is provided for locking the nut 29 in position on the bolt 28. The bracket 8 is ported as shown at 38 to permit passage of air or gas.

The reamed guide holes 17 need not extend completely through the body 10 for the full diameter, but as shown in Fig. 3, may be narrowed down at the lower end 39. The restriction 39 prevents the valve stems 18 from dropping downwardly into the mechanism of the compressor in the event that one of the valves should fail and the head portion fractured from the stems 18.

A pocket 9 is formed in the retainer 24. The pin 35 on the bolt-head 30 is adapted to be received within this pocket 9 when the bolt 28 is inserted through the retainer 24 in a position reversed from that shown in Figs. 1 to 4. Reversing of the bolt 28 is necessary when it is desired to use the valve assembly on the inlet side of the compressor rather than the exhaust side. Reversal of the bolt 28 is required to avoid undue projection of the bolt and nut 29 into the valve recess 13.

In the modified form of the invention shown in Figs. 5 and 6, parts which are similar to those described are indicated with the same numeral plus the suffix "a." In this modification the body 10a is provided with a plurality of large recesses 40 bored therethrough to receive guide inserts 41. Each of these inserts 41 is press fitted within one of the recesses 40 and is provided with a central cylindrical guide 42 for the reception of the stem 18a of the valves 19a. The bolt 28a and nut 29a maintain the body 10a and the retainer 24a in operative position. In this construction the retainer 24a is provided with a plurality of stop-pins 43 which have a portion thereof received within apertures 44 provided in the retainer 24a. The compression springs 26a encircle the stop-pins 43 and are received within counter bores 25a formed within the retainer 24a.

As shown in Fig. 5, the guide inserts 41 do not completely fill the bored recesses 40, but on the contrary are formed to define passageways 45 for air or gas between the inserts 41 and the bored recesses 40. This construction avoids the necessity of drilling a large number of air passages such as drilled holes 22 shown in Fig. 3. The modified form of retainer 24a provides adequate area for passage of air or gas without the necessity of drilling holes through the retainer such as are illustrated at 34 in Fig. 3.

The constructions above described in connection with the preferred embodiment and the modification thereof provide a valve assembly which has been found to be superior to the flat ported disk-type valves now in service. In high pressure operation where high impact loads are sustained by the valves, the assemblies constructed in accordance with this invention have given outstanding service. The poppet-type valves employed are positively guided and seat simultaneously over the full area of contact. In this way the possibility of one side of the valve element contacting before the other side, together with the hammer blow which results when the valve finally seats, is avoided. The very short travel employed for a relatively large number of sealing elements has the very desirable advantage of providing adequate passage for air or gas without undesirable inertia effects. Quick opening and closing are obtained without heavy impact loads.

Having fully described my invention, it is to be understood that I do not wish to be limited to the details herein set forth, but my invention is of the full scope of the appended claims.

I claim:

1. A valve assembly comprising a block adapted to be inserted in a housing, said block having a central axial bore therethrough and a plurality of spaced axial passages extending through said block and grouped around said bore, each of said passages having a frusto-conical valve seat at one end thereof and having an insert therein, said insert having a plurality of open portions cooperating with said passage to form flow passageways and also having a central cylindrical valve guide, a valve associated with each of said passages and inserts, each of said valves including a stem slidably guided in said valve guide and a head having a frusto-conical seating face engageable with said valve seat, a mounting bolt extending through said axial bore beyond the end of said block having said valve seats thereon, a retainer member mounted on the projection end of said bolt, a nut on said bolt securing said retainer to said block, said retainer having a plurality of recesses therein opening toward and in axial alignment with said valves, springs seated within said recesses and engaging said valve heads, the inner surface of said retainer forming stop means for said valves limiting travel thereof, and a spacer on said bolt interposed between said block and retainer and cooperating with said retainer to position the same with respect to said conical valve seats, the thickness of said spacer being predetermined to position the retainer to limit the travel of the valves the amount necessary to accommodate the required flow through said passages, each of said spring means being so constructed and arranged that when cooperating with a spacer of a thickness wherein the retainer is positioned to limit the travel of the valve heads to the minimum amount necessary for full fluid flow through the passages, the force applied to said valve heads in a closing direction is less than that applied by the pressure acting on said valve heads in an opening direction.

2. A compressor valve assembly comprising a block having a central axial bore extending therethrough and a plurality of flow passages extending through said block and spaced about said central bore, said flow passages terminating in outwardly flaring valve seats formed in an end of said block, a retainer spaced from said valve seats and having an axial bore for registering with the central bore of said block, means extending through said central axial bores for securing said retainer to said block in axially spaced relation with respect thereto, said retainer also having a plurality of recesses therein opening toward said valve seats and in axial alignment therewith, an insert mounted in each of said flow passages, each of said inserts having open portions cooperating with said flow passages to accommodate the flow of fluid therethrough and also having an axially extending cylindrical valve guide extending therealong, a valve having a valve stem slidably guided in said insert and having a valve head thereon limited in travel by engagement with said retainer, said valve head having a valve face conforming to the form of said seat for seating engagement therewith, a spring seated in each of said recesses in said retainer and engaging an aligned valve head to bias said valves into closed positions, and spacer means interposed between said retainer and the associated face of said block and cooperating with said block and retainer and of a thickness required to space said retainer a predetermined distance from said flaring valve seats and position said retainer to limit the travel of the valves to no greater travel than that necessary to accommodate the required flow of fluid through said passages, each of said spring means being so constructed and arranged that when cooperating with a spacer spacing said retainer from the corresponding face of said block a distance to position said retainer to limit the travel of the valve heads to the minimum amount necessary for full flow of fluid through said passages, the force applied to said valve heads in a closing direction is less than that applied by the pressure acting on said valve heads in an opening direction.

EDWIN D. WATSON.

REFERENCES CITED

The following references are of record in the file of this patent:

UNITED STATES PATENTS

| Number | Name | Date |
|---|---|---|
| 388,037 | Hargin | Aug. 21, 1888 |
| 979,811 | Wallem | Dec. 27, 1910 |
| 1,114,978 | Gamble | Oct. 27, 1914 |
| 1,376,484 | Tuttle | May 3, 1921 |
| 1,539,127 | Lipman | May 26, 1925 |
| 1,595,116 | Newell | Aug. 10, 1926 |
| 1,651,235 | Terrill | Nov. 29, 1927 |
| 1,797,453 | Thomas | Mar. 24, 1931 |
| 2,140,328 | Mozier | Dec. 13, 1938 |
| 2,197,455 | Volpin | Apr. 16, 1940 |
| 2,233,649 | Stahl | Mar. 4, 1941 |